United States Patent
Schwarz et al.

(10) Patent No.: US 11,500,105 B2
(45) Date of Patent: Nov. 15, 2022

(54) TRANSMITTER OPTICS FOR A LIDAR SYSTEM, OPTICAL ARRANGEMENT FOR A LIDAR SYSTEM, LIDAR SYSTEM AND WORKING DEVICE

(71) Applicant: Robert Bosch GmbH, Stuttgart (DE)

(72) Inventors: Hans-Jochen Schwarz, Stuttgart (DE); Joern Ostrinsky, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 517 days.

(21) Appl. No.: 16/612,488

(22) PCT Filed: May 8, 2018

(86) PCT No.: PCT/EP2018/061752
§ 371 (c)(1),
(2) Date: Nov. 11, 2019

(87) PCT Pub. No.: WO2018/206517
PCT Pub. Date: Nov. 15, 2018

(65) Prior Publication Data
US 2021/0157008 A1    May 27, 2021

(30) Foreign Application Priority Data
May 12, 2017  (DE) .......................... 102017208052.3

(51) Int. Cl.
*G01S 7/481*     (2006.01)
*G01S 17/931*    (2020.01)
*G01S 17/89*     (2020.01)

(52) U.S. Cl.
CPC .......... *G01S 17/931* (2020.01); *G01S 7/4812* (2013.01); *G01S 7/4814* (2013.01); *G01S 7/4817* (2013.01); *G01S 17/89* (2013.01)

(58) Field of Classification Search
CPC .... G01S 17/931; G01S 7/4812; G01S 7/4814; G01S 7/4817; G01S 17/89; G01S 7/4818
See application file for complete search history.

(56) References Cited

U.S. PATENT DOCUMENTS 5,684,611 A * 11/1997 Rakuljic .................. G03H 1/02
5,872,621 A *  2/1999 Wilkerson ............... G01P 5/26
                                                       356/28.5
(Continued)

FOREIGN PATENT DOCUMENTS

DE   102009040990 A1   3/2011
DE   112011101667 T5   5/2013
(Continued)

OTHER PUBLICATIONS

International Search Report for PCT/EP2018/061752, dated Aug. 14, 2018.

*Primary Examiner* — Peter D Nolan
*Assistant Examiner* — Anwar Mohamed
(74) *Attorney, Agent, or Firm* — Norton Rose Fulbright US LLP; Gerard A. Messina (57) ABSTRACT

A transmitting optical system for a LIDAR system is described for illuminating a field of view with light, having a linear light source for generating and outputting primary light in linear form; and having a deflecting optical system that has a lens assemblage in an intermediate image plane of the deflecting optical system for outputting received primary light into the field of view, and has a deflecting mirror, pivotable one-dimensionally around an axis, for receiving primary light from the linear light source and for directing the primary light onto the lens assemblage and, in that context, imaging the linear light source onto the lens assemblage in such a way that the image of the linear light source
(Continued)

sweeps over the lens assemblage, or over a part thereof, upon a pivoting motion of the deflecting mirror.

10 Claims, 5 Drawing Sheets

(56) References Cited

U.S. PATENT DOCUMENTS

| | | | | |
|---|---|---|---|---|
| 10,840,922 B1* | 11/2020 | Stelzer | .................. | G01S 7/4863 |
| 2009/0201486 A1* | 8/2009 | Cramblitt | .............. | G01S 7/4817 |
| | | | | 702/159 |
| 2012/0075422 A1* | 3/2012 | Wang | ...................... | G01S 17/89 |
| | | | | 348/46 |
| 2015/0016777 A1* | 1/2015 | Abovitz | ............. | G02B 27/0093 |
| | | | | 385/37 |
| 2015/0286340 A1* | 10/2015 | Send | ...................... | G01B 11/25 |
| | | | | 250/206.1 |
| 2015/0309264 A1* | 10/2015 | Abovitz | ................... | G02B 6/32 |
| | | | | 385/33 |
| 2016/0299228 A1* | 10/2016 | Maleki | .................. | G01S 7/4911 |
| 2017/0343716 A1* | 11/2017 | Wan | ...................... | G01S 7/4812 |
| 2018/0059305 A1* | 3/2018 | Popovich | ........... | G02B 27/0101 |
| 2018/0232048 A1* | 8/2018 | Popovich | ........... | G02B 27/0093 |
| 2019/0346569 A1* | 11/2019 | Hartmann | ............... | G01S 17/42 |

FOREIGN PATENT DOCUMENTS

| | | |
|---|---|---|
| DE | 102013221506 A1 | 4/2015 |
| DE | 102015217908 A1 | 3/2017 |
| EP | 1688761 A1 | 8/2006 |
| EP | 2696166 A2 | 2/2014 |
| JP | H05113481 A | 5/1993 |
| JP | H1082634 A | 3/1998 |
| JP | 2015114562 A | 6/2015 |
| WO | 2015189024 A1 | 12/2015 |

* cited by examiner

TRANSMITTER OPTICS FOR A LIDAR SYSTEM, OPTICAL ARRANGEMENT FOR A LIDAR SYSTEM, LIDAR SYSTEM AND WORKING DEVICE

FIELD

The present invention relates to a transmitting optical system for a LIDAR system for illuminating a field of view with light; to an optical assemblage for a LIDAR system for optical detection of a field of view; to a LIDAR system as such; and to a working apparatus and in particular to a vehicle.

BACKGROUND INFORMATION

Operational assistance systems of sensor assemblages are increasingly being used to detect the operating environment in the context of utilization of working apparatuses, vehicles, and other machines and systems. In addition to radar-based systems or systems based on ultrasound, light-based detection systems are also utilized, for example light detection and ranging (LIDAR) systems.

With scanning LIDAR systems, once the primary light has been generated it is guided through rotating or pivoted optical elements over the field of view, in order to sweep over the latter in a scanning fashion with primary light. On the one hand, the oscillating or rotating components of such systems involve comparatively large inertial forces that must be overcome. In addition, optical elements that are used, in the form of microlenses or the like, must also be hit as accurately as possible in the context of the motion of further optical components in order to achieve high imaging quality. This requires a considerable outlay in terms of apparatus and control technology.

SUMMARY

An example transmitting optical system according to the present invention for a LIDAR system, may have the advantage that particularly low-loss and accurately imaged detection of the field of view is achieved in a scanning LIDAR system with a comparatively simple configuration and with reduced inertial forces. This is achieved according to an example embodiment of the present invention by the fact that a transmitting optical system for a LIDAR system for illuminating a field of view with light is described, which system is embodied (i) with a linear light source for generating and outputting primary light in linear form; and (ii) with a deflecting optical system that has a lens assemblage in an intermediate image plane of the deflecting optical system for outputting received primary light into the field of view, and has a deflecting mirror, pivotable one-dimensionally around an axis, for receiving primary light from the linear light source and for directing the primary light onto the lens assemblage and, in that context, optically imaging the linear light source onto the lens assemblage in such a way that the image of the linear light source sweeps over the lens assemblage, or over a part thereof, upon a pivoting motion of the deflecting mirror.

Preferred refinements of the present invention are described herein.

A variety of embodiments are suitable for the lens assemblage.

According to a preferred embodiment of the transmitting optical system according to the present invention, for example, the lens assemblage for outputting the received primary light into the field of view can have (a) a segmented lens assemblage, a lens array, a lens matrix, a microlens array, a rod lens array having a plurality of rod lenses having parallel rod axes, in particular having rod axes oriented parallel to a pivot axis of the pivoting mirror, (b) a diffractive optical element, in particular a DOE, and/or (c) a hologram.

A variety of embodiments having one or several underlying light sources are also appropriate with regard to the linear light source.

The transmitting optical system according to the present invention can have (A) a laser, an edge emitting laser, a surface emitting laser, a vertical cavity surface emitting laser (VCSEL), a vertical external cavity surface emitting laser (VeCSEL), and/or (B) an assemblage having an illuminatable or illuminated gap. Alternatively thereto, a respective laser can also be embodied as a gas laser or as a solid-state laser that is expanded into a line using a corresponding beam-shaping optical system.

A variety of embodiments are also possible with regard to the deflecting mirror, which can also be referred to in general as a "deflecting unit."

According to preferred embodiments of the transmitting optical system, the deflecting mirror can be embodied
- to perform a pivoting motion and/or a rotary motion, in particular around a fixed rotation axis, continuously and/or in the form of a rotary oscillation;
- with at least one prismatic mirror or one polyhedral mirror having a polygonal cross-sectional area or base outline;
- with at least one planar, convex, and/or concave mirror surface;
- with at least one micromirror;
- on a silicon basis;
- to be operated or operable statically and/or resonantly.

Other advantageous refinements in the transmitting optical system according to the present invention for a LIDAR system have an intermediate-image optical system. This intermediate-image optical system can be embodied
- to image the linear light source onto the lens assemblage;
- as an optical system between the deflecting mirror and the linear light source;
- as an optical system between the linear light source and the deflecting mirror;
- as a beam-shaping optical system for generating a linear illumination on the lens assemblage, in particular in the form of a laser line; and/or
- as a telecentric and/or F-Theta optical system for generating a flat image field in the intermediate image plane.

The present invention furthermore relates to an optical assemblage for a LIDAR system as a whole, namely for optical detection of a field of view, in particular for a working apparatus and/or for a vehicle, having a transmitting optical system for illuminating a field of view with primary light, which is embodied in accordance with the present invention, and having a receiving optical system for receiving secondary light from the field of view.

In an advantageous refinement of the optical assemblage according to the present invention for a LIDAR system, the transmitting optical system and the receiving optical system are embodied, for instance, with beam paths that are at least partly or locally coaxial with one another, in particular in the region of the beam exit side and the beam entrance side of the LIDAR system.

In these circumstances, a beam splitter can be embodied to transfer the beam paths from a coaxial form on the beam exit side and the beam entrance side of the optical assemblage of the LIDAR system into a path from the linear light source of the transmitting optical system and into a path to a detector assemblage of the receiving optical system.

Also possible, alternatively thereto, are optical assemblages according to the present invention for a LIDAR system which, despite the partial or local coaxial configuration of the beam paths of the transmitting optical system on the beam exit side and the receiving optical system on the beam entrance side, are configured without a beam splitter, a provided detector assemblage of the receiving optical system then being disposed in the immediate vicinity of the linear light source and/or alongside the linear light source.

In an alternative embodiment of the optical assemblage according to the present invention for a LIDAR system, the transmitting optical system and the receiving optical system are embodied with beam paths that are substantially or for the most part separated from and/or biaxial with respect to one another, in particular on the beam exit side of the transmitting optical system and on the beam entrance side of the receiving optical system.

In accordance with a further aspect of the present invention, a LIDAR system as such is also created, which system is embodied for optical detection of a field of view and in particular for a working apparatus and/or for a vehicle, and has an optical assemblage according to the present invention.

Also subjects of the present invention are a working apparatus and in particular a vehicle which are embodied with a LIDAR system in accordance with the present invention for optical detection of a field of view.

BRIEF DESCRIPTION OF THE DRAWINGS

Example embodiments of the present invention are described in detail below with reference to the figures.

DETAILED DESCRIPTION OF EXAMPLE EMBODIMENTS

Exemplifying embodiments of the present invention, and the technical background, will be described below in detail with reference to FIGS. 1 to 5. Identical and equivalent, and identically or equivalently functioning, elements and components are labeled with the same reference characters. The detailed description of the labeled elements and components will not be reproduced each time they occur.

The features that are presented, and further properties, can be combined in any manner in isolation from one another, and combined in any way with one another, without departing from the essence of the present invention.

Figure 1:
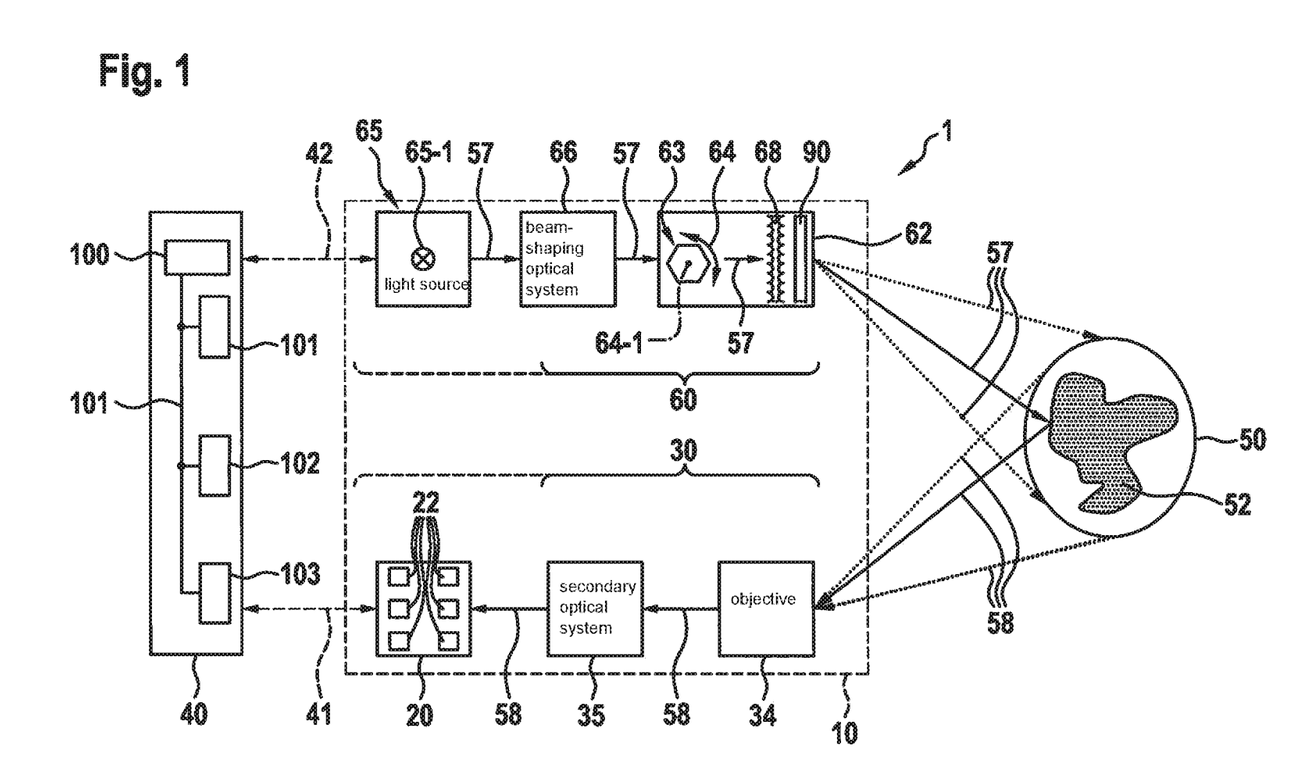
FIG. 1 shows, in the form of a schematic block diagram, the configuration of an example embodiment of the LIDAR system according to the present invention.

FIG. 1 shows, in the form of a schematic block diagram, an embodiment of LIDAR system 1 according to the present invention utilizing an embodiment of optical arrangement 10 according to the present invention.

LIDAR system in accordance with FIG. 1 has an embodiment of transmitting optical system 60 according to the present invention which is fed from a light source unit 65 having a linear light source 65-1, for instance in the form of a laser, and emits primary light 57, optionally after passing through a beam-shaping optical system 66, into a field of view 50 for investigation of an object 52 present therein.

LIDAR system 1 according to FIG. 1 furthermore has a receiving optical system 30 that receives, via an objective 34 constituting a primary optical system, secondary light 58 reflected from object 52 in field of view 50, and transfers it, optionally via a secondary optical system 35, to a detector assemblage 20 for detection.

Light source unit 65 having linear light source 65-1, and detector assemblage 20, are controlled by way of a control and evaluation unit 40 via respective control leads 42 and 41.

Essential aspects of the present invention are concentrated in the region of deflecting optical system 62, and are manifested in the provision of a rotary mirror 63 that is pivotable or rotatable around a rotation axis or pivot axis 64-1 by way of a pivoting motion 64 or rotary motion 64, in order thereby to illuminate lens assemblage in scanning and imaging fashion with an image of linear light source 65-1 of light source unit 65. Lens assemblage 68, having a plurality of individual lenses, is embodied to direct primary light 57 into field of view 50 having object 52 contained therein.

Also preferably embodied as part of deflecting optical system 62 is a projecting optical system 90 that is configured to emit primary light 57 at the various angles into field of view 50 and, as applicable, correspondingly to receive secondary light 58 from the various angles of field of view 50 in the form of an objective.

Figure 2:
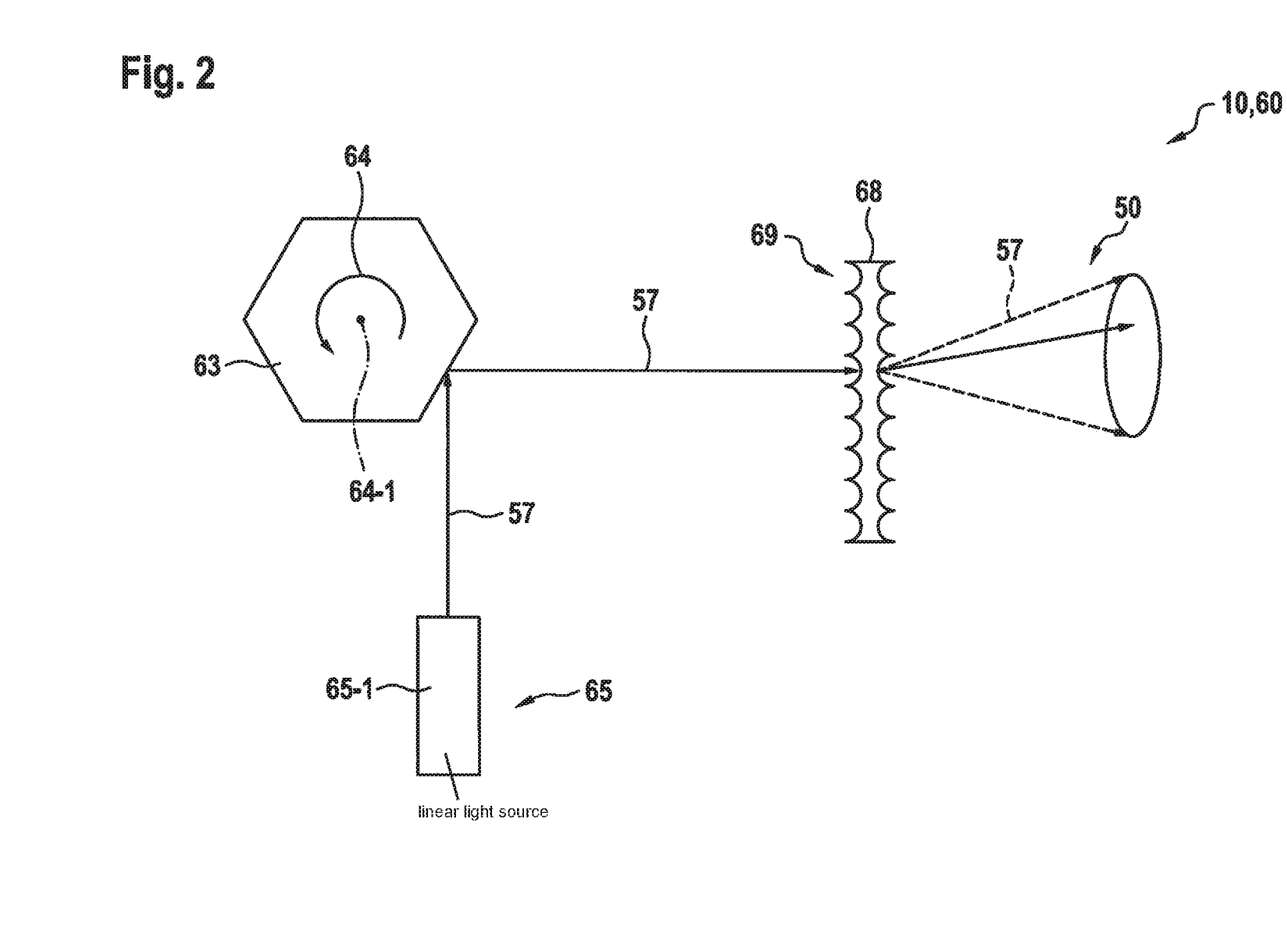
FIG. 2 shows, in the form of a schematic plan view, a first embodiment of the transmitting optical system according to the present invention.

FIG. 2 shows, in the form of a schematic plan view, an embodiment of transmitting optical system 60 according to the present invention constituting part of an optical assemblage 10 for a LIDAR system 1, and concentrates on essential aspects of the present invention.

Those aspects involve the utilization of a linear light source 65-1 as a constituent of light source unit 65, and the use of a lens assemblage 68 that defines an intermediate image plane 69 on which, by way of a rotary mirror 63 that is provided as a third feature and is rotatable via a rotary motion 64 around a rotation axis 64-1, an image of linear light source 65-1 is imaged in a manner that sweeps over intermediate image plane 69 and thus over lens assemblage 68.

Lens assemblage 68 itself serves to direct primary light 57 into field of view 50 in order thereby to monitor field of view 50 constituting a surrounding area.

In the embodiment in accordance with FIG. 2, rotary mirror 63 is embodied as a prismatic mirror having a base outline in the shape of an equilateral hexagon, and having square or rectangular mirror surfaces. Lens assemblage 68 is made up of a plurality of rod lenses, oriented parallel to one another, whose axis of symmetry is oriented parallel to rotation axis 64-1 of rotary mirror 63. The individual lens segments are configured here, by way of example, in biconcave fashion.

Figure 3:
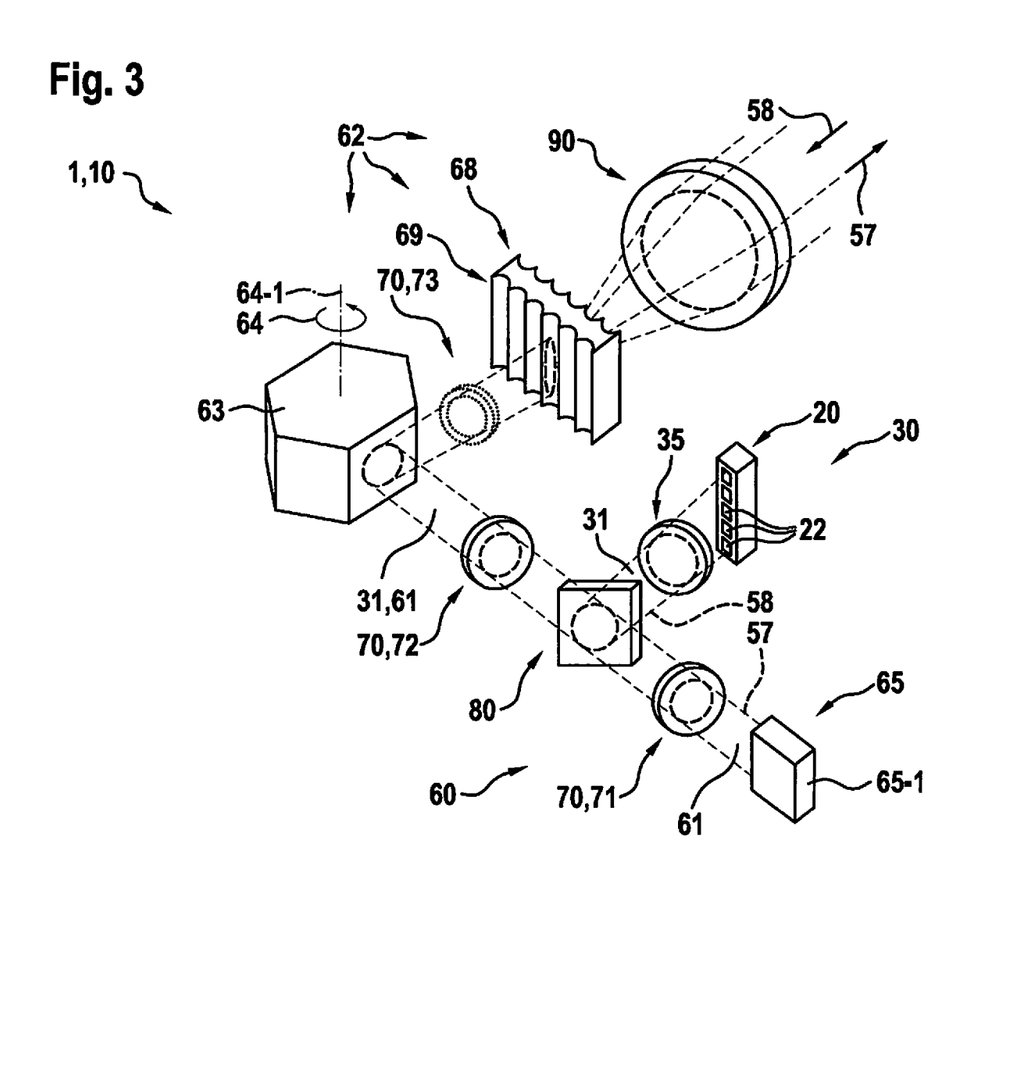
FIGS. 3 and 4 show, in the form of schematic plan views, example embodiments of the LIDAR system according to the present invention utilizing embodiments of the transmitting optical system according to the present invention.
Figure 4:
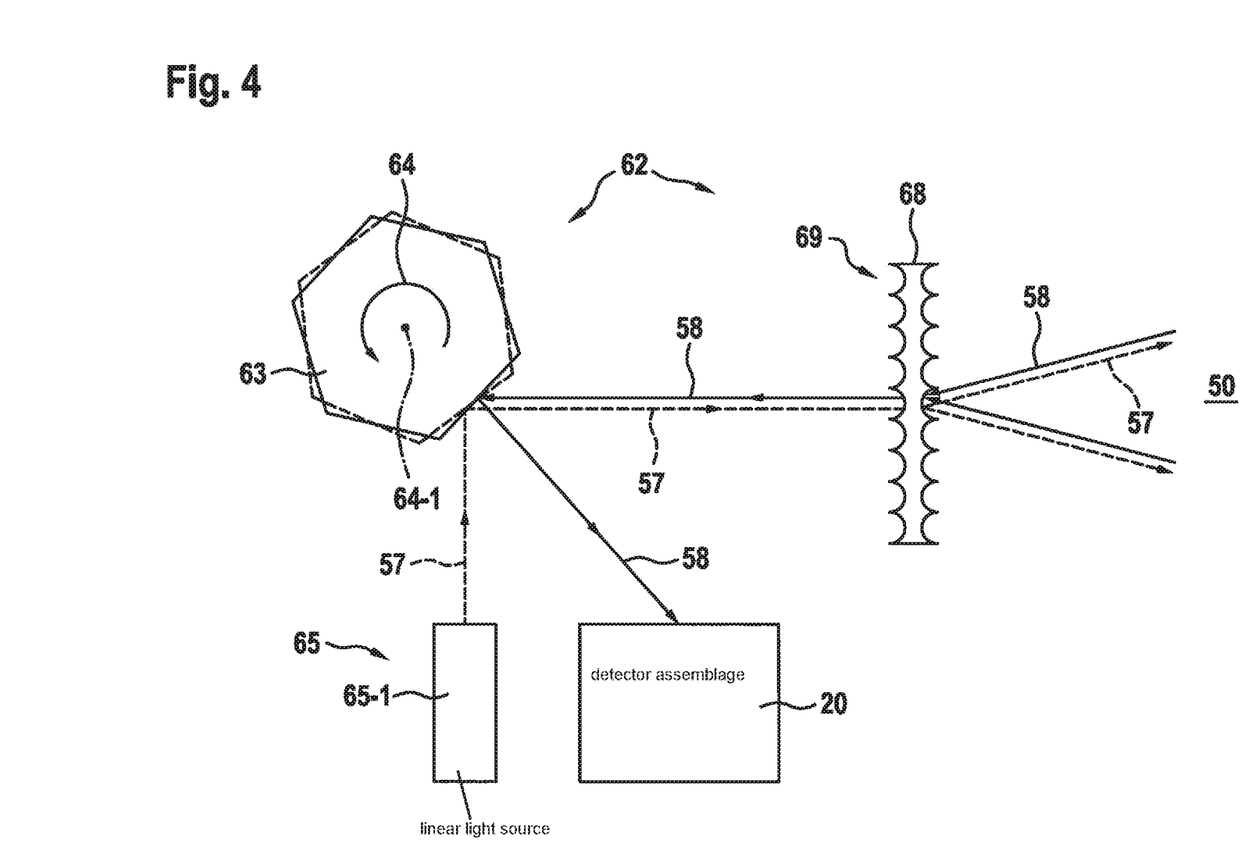

FIGS. 3 and 4 show, in the form of schematic plan views, embodiments of LIDAR system 1 according to the present invention utilizing embodiments of transmitting optical system 60 according to the present invention.

In the embodiment according to FIG. 3, beam paths 31 and 61 of receiving optical system 30 and of transmitting optical system 60 according to the present invention are embodied partly coaxially with one another, and become separated only in the region of and as a result of beam splitter 80.

Transmitting optical system 60 in accordance with FIG. 3 corresponds in essence to the embodiment according to FIG. 2. In addition, however, an intermediate-image optical system 70 having partial optical systems 71, 72, and 73 (the latter optional) is embodied here between linear light source 64-1 of light source unit 65 and beam splitter 80, between linear light source 65-1, beam splitter 80, and rotary mirror 63, and between rotary mirror 63 and intermediate image plane 69 of lens assemblage 68.

In addition, a further objective optical system 90 is provided between rotary mirror 63 and lens assemblage 68, and serves to project primary light 57 into field of view 50 and to back-project secondary light 58 coming from field of view 50.

A detector assemblage 20 having a plurality of sensor elements 22 is located on the receiver side after the division of beam paths 61 and 31 respectively of transmitting optical system 60 and of receiving optical system 30. Embodied between detector assemblage 20 and beam splitter 80 is a secondary optical system 35 of receiving optical system 30 for suitably imaging secondary light 58 onto detector assemblage 20 and onto sensor elements 22.

The embodiment in accordance with FIG. 4 is also embodied in essence with coaxially guided beam paths 31 and 61 respectively for receiving optical system 30 and for transmitting optical system 60, although a beam splitter 80 is not used here. Instead, in this case detector assemblage 20 is embodied in the immediate vicinity of linear light source 65-1 of light source unit 65.

Figure 5:
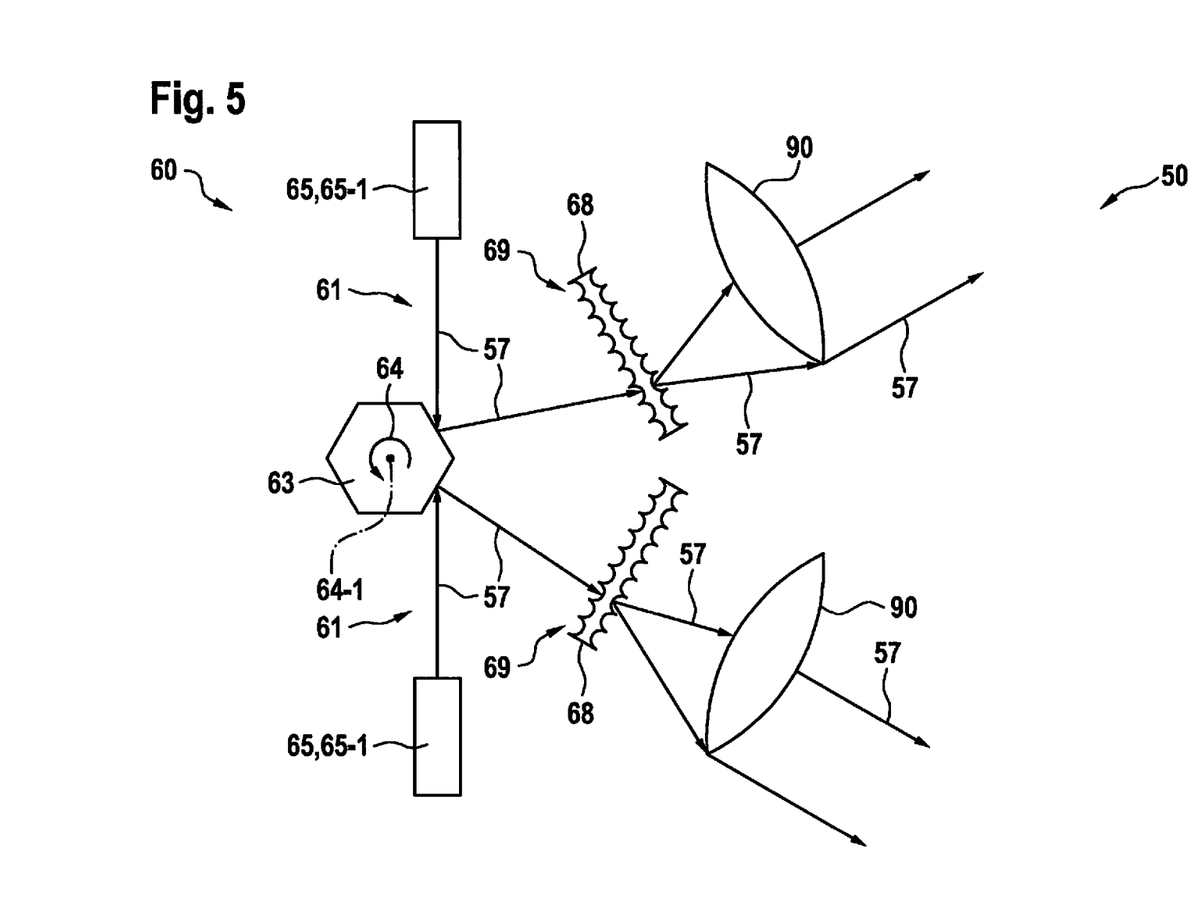
FIG. 5 shows, in the form of a schematic plan view, an example embodiment of the transmitting optical system according to the present invention having two transmission paths.

FIG. 5 shows, in the form of a schematic plan view, an embodiment of transmitting optical system 60 according to the present invention having two transmission paths 61.

In this case, as shown in FIG. 5, a pair of linear light sources 65-1 are embodied as constituents of light source unit 65. Rotary mirror 63 is provided only once, however, and is used in shared fashion in both beam paths 61 in order to cast the respective images of the separate linear light sources 65-1 onto intermediate image plane 69 of lens assemblages 68, which are likewise each provided separately and by which the (now combined) field of view 50 is then illuminated via projecting optical systems 90 that are likewise provided separately.

These and further features and properties of the present invention will be further explained on the basis of the statements that follow.

The improvements proposed by the present invention proceed, for instance, from line scanners having macromirrors or having a rotating overall unit.

The embodiments are possibly biaxial, i.e. the transmission path and receiving path are configured optically separately. The embodiments can also be embodied coaxially, i.e. the transmission path and receiving path are defined via a shared optical system.

Weaknesses of macroscanners are (a) the presence of a comparatively large mechanical mirror unit or overall unit with high inertial forces and thus a greater risk of wear on shafts; (b) the influence on the total physical size of the sensor; and, depending on the embodiment, (c) the problem of transferring energy and information to the rotary platform.

Possible alternative solutions, such as inductive coupling, coupling via radio, or optical coupling, usually generate additional costs and result in decreased performance.

A weakness of point illumination concepts with an intermediate plane 69 and two-dimensional mirrors is the need to accurately hit microlenses that are used, which is difficult when resonantly oscillating two-dimensional mirrors are used (Lissajous figures).

According to one aspect of the present invention, a combination of the intermediate plane concept with a one-dimensional mirror and linear illumination is proposed. The mirror can be either a micromirror (p-mirror) that is operated resonantly or statically, or a miniaturized rotary mirror, e.g. a polygonal mirror that is operated at a constant angular speed.

The advantages that result are, among others:
comparatively small moving masses for both the silicon-based micromirrors and the miniature polygonal mirror;
a comparatively small overall size and more dynamic operation than with a macroscanner, thus making higher frame rates possible;
separation between the rotary unit and transmit/receive unit, therefore less complexity in terms of controlling the laser and detector;
more easily controllable light beam trajectory, since Lissajous figures cannot occur;
with fast mirrors, the ability to construct a coaxial system that does not entail beam splitter losses.

A possible configuration is depicted in FIG. 3.

Linear laser 64-1, for instance in the form of an edge emitter, is imaged via an optical system 71, e.g. with fast axis collimation, a beam splitter 80, and an optical system 72 constituting a focusing optical system, via the mirror surface of a prismatic or polygonal mirror 63, onto a microlens array 68.

In another embodiment, optical system 72 is disposed in reverse order with the prismatic or polygonal mirror 63, so that thanks to the use of optical system 73 (indicated as optional with dashed lines), firstly laser radiation 57 is deflected or diverted, and then imaging occurs onto microlens array 68 in intermediate plane 69.

Optical system 73 can be embodied as a focusing optical system having a constant F-Theta ratio, and/or with telecentricity.

In the context of a further alternative for the present invention, optical systems 72 and 73 can be embodied together.

Microlens array 68 can be made up of rod lenses that expand or enlarge the laser beam in one direction. The individual rod lenses can be constructed from spherical or aspherical elements. The individual elements can be embodied in concave or convex fashion. Both sides of microlens array 68 can be equipped with a curvature. There are also variants of the microlens array, however, in which one side is plane.

Alternatively, the lens properties of microlens array 68, e.g. an expansion or deflection of the laser light, can be generated by a diffractive optical element (DOE) or by a hologram.

The expanded beam 57 is projected via projecting optical system 90 into the environment, i.e. into field of view 50. Light scattered back from objects 52 is directed onto beam splitter 80 via projecting optical system 90, microlens array 68, mirror 63, and optical system 72.

A portion of the light is imaged via optical system 35 onto a linear detector 20, e.g. an APD linear array.

The horizontal resolution of the system is defined by the spacings of microlenses 68 and by the imaging factor of projecting optical system 90.

The vertical resolution is defined by the pixels on linear detector 20.

All the optical systems 70, 71, 72, 73, 35 are treated with a coating for high light transmission.

FIG. 3 shows an embodiment having a prismatic or polygonal mirror 63 and a beam splitter 80 for a coaxial system.

Further possible variants are depicted in FIGS. 4 and 5.

With comparatively slow-moving mirrors and many shots per microlens, the impact point shifts over the lens, resulting in lower angular resolution.

With comparatively fast-moving mirrors, the shot pattern can be placed so that the microlenses are always hit centrally.

FIG. 4 shows a transmitting optical system 60 according to the present invention having a beam path 61, 31 with no beam splitter 80 and with detector 20 outside transmission axis 61, such as can be used, for instance, with very fast-moving mirrors 63.

The returning light, constituting secondary light 58, can be directed, via mirror 63 that has by then moved farther, toward detector assemblage 20 having detector elements 22.

FIG. 5 shows a further embodiment in which mirror 63 is used in such a way that it can service two systems. The result is essentially a version having a widened field of view (FoV). Receiving paths 31 and the return paths are not shown, but could also be present in a separate optical path, i.e. in a biaxial disposition.

In accordance with the list below, a variety of possible embodiments and combinations can be implemented in the context of the present invention; the components and/or properties below can be combined with one another in any way without departing from the central idea of the present invention.

Alternatives for the System
  Coaxial
    with conventional 50/50 beam splitter or with polarizing beam splitter for a high extinction ratio;
    with pinhole beam splitter; and/or
    with detector directly next to laser, optionally with no beam splitter.
  Biaxial with separate receiving path.
Alternatives for the Laser
  Edge emitting laser
    a) Broad area laser
    b) Laser bar
      i) as single laser bar; or
      ii) as multiple laser bars soldered to one another in series, e.g. two pieces; this allows two microlenses to be hit simultaneously.
  Surface emitting laser
    a) Vertical emitter, vertical cavity surface emitting laser (VCSEL)
      i) in linear configuration;
      ii) as linear array (e.g. 50 emitters)
      iii) as low-dimensional two-dimensional array (e.g. 50×2 emitters), allowing two microlenses to be hit simultaneously; and/or
      iv) as gas laser or solid-state laser with a beam shape that is or becomes expanded into a line.
    b) Vertical emitter with external resonator, vertical external cavity surface emitting laser (VeCSEL)
      i) in linear configuration;
      ii) as linear array; and/or
      iii) as low-dimensional two-dimensional array (e.g. 50×2 emitters), allowing two microlenses to be hit simultaneously.
Alternatives for the Mirror
  Polygonal mirror
    with various numbers of surfaces; and/or
    with curved polygonal surfaces (imaging property, e.g. to shape the beam in a vertical direction).
  Micromirror, e.g. silicon-based
    resonantly operated; or
    statically operated.
Alternatives for the Detector
  Avalanche photodiode (APD) detector
    i) as linear array (e.g. 50 individual detectors); or
    ii) as low-dimensional two-dimensional array (e.g. 50×2 detectors)
  Single photon counting avalanche diode (SPAD) detector
    i) as linear array (e.g. 50 individual detectors); or
    ii) as low-dimensional two-dimensional array (e.g. 50×2 detectors); and/or
    iii) as mono- or multidimensional silicon-based photoelectron multiplier (silicon photomultiplier, SiPM).
Alternatives for the Optical Systems
  Optical system 2:
    i) as beam-shaping optical system to generate a laser line;
    ii) as telecentric F-Theta optical system to generate a flat image field in the intermediate plane with vertical light incidence and constant ratio between mechanical deflection angle and image creation;
    iii) combination of the two variants.
  Transmitting/receiving optical system
    i) as simple optical system (e.g. one to three individual lenses) for small field of view (FoV);
    ii) as complex optical system (e.g. more than three, i.e. approx. three to eight individual lenses) for large field of view.
  Microlens array
    a) Rod lenses that expand or enlarge the laser beam in one direction
      i) spherical or aspherical elements
      ii) concave or convex elements; and/or
      iii) both sides of the microlens array are curved (biconcave or biconvex) or one side is plane (planoconcave or planoconvex)
    b) Embodied as diffractive optical element (DOE)
    c) Embodied as hologram

What is claimed is:

1. A transmitting optical system for a LIDAR system for illuminating a field of view with light, comprising:
   a linear light source configured to generate and output primary light in linear form; and
   a deflecting optical system, including:
     a lens assemblage in an intermediate image plane of the deflecting optical system configured to output received primary light into the field of view, and
     a deflecting mirror, which is pivotable one-dimensionally around an axis, and which is configured to receive primary light from the linear light source and to direct the primary light onto the lens assemblage and optically image the linear light source onto the lens assemblage so that the image of the linear light source sweeps over at least a part of the lens assemblage upon a pivoting motion of the deflecting mirror;
   wherein the linear light source includes one of: (i) an edge emitting laser, including a broad area laser and a laser bar, and (ii) a surface emitting laser, including one of a vertical emitter, vertical cavity surface emitting laser (VCSEL) and a vertical emitter with external resonator, vertical external cavity surface emitting laser (VeCSEL), and wherein the detector includes one of an avalanche photodiode detector (APD) and a single photon counting avalanche diode (SPAD) detector.

2. The transmitting optical system as recited in claim 1, wherein the lens assemblage includes: (a) a segmented lens assemblage, or a lens array, or a lens matrix, or a micro lens array, or a rod lens array having a plurality of rod lenses having parallel rod axes and having rod axes oriented parallel to a pivot axis of the pivoting mirror, and/or (b) a diffractive optical element (DOE), and/or (c) a hologram.

3. The transmitting optical system as recited in claim 1, wherein the linear light source includes: (a) a laser, or an edge emitting laser, or a surface emitting laser, or a VCSEL, or a VeCSEL, or a gas laser, or a solid-state laser, and/or (b) an assemblage having an illuminable or illuminated gap.

4. The transmitting optical system as recited in claim 1, wherein the deflecting mirror is configured: (a) to perform a pivoting motion or a rotary motion around a fixed rotation axis continuously and/or in the form of a rotary oscillation, (b) with a prismatic mirror or a polyhedral mirror having a polygonal cross-sectional area or base outline, (c) with a planar, and/or convex, and/or concave mirror surface, (d) with a micromirror, (e) on a silicon basis, and (f) to be operated statically and/or resonantly.

5. The transmitting optical system as recited in claim 1, further comprising:
an intermediate-image optical system that is configured:
(a) to image the linear light source onto the lens assemblage, and/or (b) as an optical system between the deflecting mirror and the linear light source, and/or (c) as an optical system between the linear light source and the deflecting mirror, and/or (d) as a beam-shaping optical system for generating a linear illumination on the lens assemblage in the form of a laser line, and/or (e) as a telecentric and/or F-Theta optical system for generating a flat image field in the intermediate image plane.

6. An optical assemblage for a LIDAR system for optical detection of a field of view for a working apparatus and/or for a vehicle, comprising:
a transmitting optical system to illuminate the field of view with primary light including:
a linear light source to generate and output primary light in linear form, and
a deflecting optical system, which that includes:
a lens assemblage in an intermediate image plane of the deflecting optical system to output received primary light into the field of view, a lens assemblage in an intermediate image plane of the deflecting optical system to output received primary light into the field of view, and
a deflecting mirror which is pivotable one-dimensionally around an axis, and is configured to receive primary light from the linear light source and to direct the primary light onto the lens assemblage and optically image the linear light source onto the lens assemblage so that the image of the linear light source sweeps over at least a part of the lens assemblage upon a pivoting motion of the deflecting mirror; and
a receiving optical system to receive secondary light from the field of view;
wherein the linear light source includes one of: (i) an edge emitting laser, including a broad area laser and a laser bar, and (ii) a surface emitting laser, including one of a vertical emitter, vertical cavity surface emitting laser (VCSEL) and a vertical emitter with external resonator, vertical external cavity surface emitting laser (VeCSEL), and wherein the detector includes one of an avalanche photodiode detector (APD) and a single photon counting avalanche diode (SPAD) detector.

7. The optical assemblage as recited in claim 6, wherein the transmitting optical system and the receiving optical system are configured with: (i) beam paths that are at least partly or locally coaxial with one another; and (ii) a beam splitter or without a beam splitter, having a detector assemblage of the receiving optical system in an immediate vicinity of the linear light source and/or alongside the linear light source.

8. The optical assemblage as recited in claim 6, wherein the transmitting optical system and the receiving optical system include mutually biaxial beam paths.

9. A LIDAR system for optical detection of a field of view for a working apparatus and/or for a vehicle, comprising:
an optical assemblage for optical detection of a field of view for a working apparatus and/or for a vehicle, the optical assemblage including:
(a) a transmitting optical system to illuminate the field of view with primary light, the transmitting optical system including a linear light source to generate and output primary light in linear form, and a deflecting optical system that includes a lens assemblage in an intermediate image plane of the deflecting optical system to output received primary light into the field of view, and a deflecting optical system that includes a lens assemblage in an intermediate image plane of the deflecting optical system to output received primary light into the field of view, and a deflecting mirror which is pivotable one-dimensionally around an axis, and is configured to receive primary light from the linear light source and to direct the primary light onto the lens assemblage and optically image the linear light source onto the lens assemblage so that the image of the linear light source sweeps over at least a part of the lens assemblage upon a pivoting motion of the deflecting mirror, and
(b) a receiving optical system to receive secondary light from the field of view;
wherein the linear light source includes one of: (i) an edge emitting laser, including a broad area laser and a laser bar, and (ii) a surface emitting laser, including one of a vertical emitter, vertical cavity surface emitting laser (VCSEL) and a vertical emitter with external resonator, vertical external cavity surface emitting laser (VeCSEL), and
wherein the detector includes one of an avalanche photodiode detector (APD) and a single photon counting avalanche diode (SPAD) detector.

10. A vehicle, comprising:
a LIDAR system for optical detection of a field of view, the LIDAR system including:
an optical assemblage for optical detection of a field of view for a working apparatus and/or for a vehicle, the optical assemblage including:
(a) a transmitting optical system to illuminate the field of view with primary light, the transmitting optical system including a linear light source to generate and output primary light in linear form, and a deflecting optical system that includes a lens assemblage in an intermediate image plane of the deflecting optical system to output received primary light into the field of view, and a deflecting mirror which is pivotable one-dimensionally around an axis, and is configured to receive primary light from the linear light source and to direct the primary light onto the lens assemblage and optically image the linear light source onto the lens assemblage so that the image of the linear light source sweeps over at least a part of the lens assemblage upon a pivoting motion of the deflecting mirror, and (b) a receiving optical system to receive secondary light from the field of view;

wherein the linear light source includes one of: (i) an edge emitting laser, including a broad area laser and a laser bar, and (ii) a surface emitting laser, including one of a vertical emitter, vertical cavity surface emitting laser (VCSEL) and a vertical emitter with external resonator, vertical external cavity surface emitting laser (VeCSEL), and wherein the detector includes one of an avalanche photodiode detector (APD) and a single photon counting avalanche diode (SPAD) detector.

* * * * *